Patented Sept. 10, 1940

2,213,977

UNITED STATES PATENT OFFICE 2,213,977

PHARMACEUTICAL

Walter G. Christiansen, Glen Ridge, N. J., assignor to E. R. Squibb & Sons, New York, N. Y., a corporation of New York No Drawing. Application July 29, 1939,
Serial No. 287,242

10 Claims. (Cl. 167—81)

This invention relates to cevitamic acid compositions for parenteral administration.

The parenteral administration of cevitamic acid is often desirable, as when there is need for rapid action or there are difficulties attending oral administration. Since cevitamic acid is not suitable for injection directly because of its acidity (which would cause pain and tissue damage), it has heretofore been administered in the form of its substantially neutral salt in aqueous solution. Both cevitamic acid and its salts, being autoxidizable, are unstable in aqueous solution; and hence the solutions lose physiological potency, especially when heated, and are unstable even when prepared in the absence of oxygen and carefully sterilized.

It is the object of this invention to provide stabilized cevitamic acid compositions for parenteral administration, and a method of preparing them.

It has been found that aqueous solutions of cevitamic acid salts may be stabilized by inclusion of a substantially neutral, water-soluble hypophosphite, notably sodium hypophosphite, and that such inclusion is further advantageous in that it renders unnecessary the maintenance of an oxygenic condition in preparing and ampuling such solutions.

The invention is applicable generally to aqueous solutions of substantially neutral salts of cevitamic acid, i. e. solutions of various concentrations and of salts with either inorganic or organic bases. The stabilization is more effective with cevitamic acid salts of organic bases, notably salts of aliphatic (including alicyclic) amines such as monoethanolamine, morpholine, piperidine, and pipecoline.

The cevitamic acid salts of inorganic bases to which this invention is applicable include, inter alia, the sodium, calcium, and ammonium salts; and the cevitamic acid salts of organic bases to which this invention is applicable include, inter alia, the amine salts disclosed in U. S. Patent No. 2,132,662, as well as salts of other alkyl amines, alkanol amines, alkylene diamines, polyhydroxyalkyl amines, alkanol alkyl amines, alicyclic amines, and heterocyclic amines.

The neutral, water-soluble hypophosphite employed as the stabilizing agent must, of course, be stable and innocuous. The alkali-metal (which term, as used herein, embraces the ammonium) hypophosphites are preferred. Manifestly, the hypophosphite may be formed in situ, as by adding the requisite amount of hypophosphorous acid (in aqueous solution) to an aqueous solution of the cevitamic acid salt containing an excess of the base from which the cevitamic acid salt was formed. A minute proportion, less than 1%, of the hypophosphite suffices to stabilize aqueous solutions of cevitamic acid salts; for example, proportions in the range of about 0.1 to 0.5% by weight of the cevitamic acid salt solution will effectively stabilize it.

Although the stabilization eliminates the need for anaeric handling and packaging (ampuling) of the solutions, the effectiveness of the stabilizing agent is enhanced by filling the ampule as fully as possible—with consequent minimization of the air remaining in the ampule; and the stabilized solutions may, of course, be anaerically handled and/or packaged.

The following examples are illustrative of the invention:

Example 1

1.25 g. sodium hypophosphite is dissolved in 200 cc. double-distilled water; then 12.5 g. cevitamic acid and 6.11 g. tetrahydro-1,4-oxazine (morpholine) are successively dissolved in the hypophosphite solution, which is next made up to 250 cc., Berkefeld-filtered under aseptic conditions, and filled (also under aseptic conditions) into sterile glass ampules. Further to insure sterility, the sealed ampules may be heated for one hour at 65° C.

The resulting solution is stable, losing only 2.82% and 4.23% of its cevitamic acid concentration in five months' storage at, respectively, room temperature and 100° F. Moreover, the stabilized solution (in contrast with the unstabilized) contains no insoluble matter and is not strongly discolored.

Example 2

A stabilized solution of cevitamic acid neutralized with piperidine is prepared in the manner detailed in Example 1, using 6.04 g. piperidine in place of the morpholine. The resulting solution loses only 4.69% of its cevitamic acid concentration in six months' storage at room temperature, and only 2.45% in three months at 100° F.

Example 3

A stabilized solution of the monoethanolamine salt of cevitamic acid is prepared in the manner detailed in Example 1, using 4.76 g. monoethanolamine in place of the morpholine. The resulting solution loses only 5.67% of its cevitamic acid concentration in five months' storage at 100° F.

(as contrasted with a loss of 10.46% by the unstabilized product under similar conditions).

*Example 4*

A stabilized solution of cevitamic acid neutralized with pipecoline is prepared in the manner detailed in Example 1, using 7.03 g. pipecoline in place of the morpholine.

*Example 5*

2.5 g. sodium hypophosphite and 25 g. cevitamic acid are dissolveed in 500 cc. double-distilled water, and the solution neutralized by adding 11.93 g. sodium bicarbonate; the solution is then sterilized by Berkefeld-filtration under aseptic conditions, filled into sterile ampules under aseptic conditions, and pasteurized by heating at 65° C. for a half hour. The resulting solution takes almost twice as long to lose the same proportion of its cevitamic acid content at 100° F. as the unstabilized solution.

The invention may be variously otherwise embodied, within the scope of the appended claims.

I claim:

1. An aqueous solution of a cevitamic acid salt, stabilized by inclusion of a substantially neutral, water-soluble hypophosphite.

2. An aqueous solution of a cevitamic acid salt, stabilized by inclusion of an alkali-metal hypophosphite.

3. An aqueous solution of a cevitamic acid salt, stabilized by inclusion of less than 1% of the solution by weight of a substantially neutral, water-soluble hypophosphite.

4. An aqueous solution of a cevitamic acid salt, stabilized by inclusion of about 0.1 to 0.5% of the solution by weight of a substantially neutral, water-soluble hypophosphite.

5. An aqueous solution of a salt of cevitamic acid with an organic base, stabilized by inclusion of a substantially neutral, water-soluble hypophosphite.

6. An aqueous solution of an aliphatic amine salt of cevitamic acid, stabilized by inclusion of a substantially neutral, water-soluble hypophosphite.

7. An aqueous solution of piperidine cevitamate, stabilized by inclusion of a substantially neutral, water-soluble hypophosphite.

8. An aqueous solution of monoethanolamine cevitamate, stabilized by inclusion of a substantially neutral, water-soluble hypophosphite.

9. An aqueous solution of sodium cevitamate, stabilized by inclusion of a substantially neutral, water-soluble hypophosphite.

10. The method of preparing a stabilized cevitamic acid composition, which comprises substantially neutralizing cevitamic acid with a base in an aqueous medium containing a substantially neutral, water-soluble hypophosphite.

WALTER G. CHRISTIANSEN.